(12) United States Patent
Mo

(10) Patent No.: US 8,493,413 B2
(45) Date of Patent: Jul. 23, 2013

(54) APPARATUS AND METHOD FOR CONTROLLING TERMINAL THROUGH MOTION RECOGNITION

(75) Inventor: Hyun-Young Mo, Gyeonggi-do (KR)

(73) Assignee: Samsung Electronics Co., Ltd., Samsung-ro, Yeongtong-gu, Suwon-si, Gyeonggi-do (KR)

( * ) Notice: Subject to any disclaimer, the term of this patent is extended or adjusted under 35 U.S.C. 154(b) by 749 days.

(21) Appl. No.: 12/708,568

(22) Filed: Feb. 19, 2010

(65) Prior Publication Data

US 2010/0214320 A1 Aug. 26, 2010

(30) Foreign Application Priority Data

Feb. 20, 2009 (KR) .................. 10-2009-0014381

(51) Int. Cl.
*G09G 5/00* (2006.01)
(52) U.S. Cl.
USPC .......................... 345/649; 345/657; 345/658
(58) Field of Classification Search
None
See application file for complete search history.

(56) References Cited

U.S. PATENT DOCUMENTS

| 2005/0143124 A1* | 6/2005 | Kennedy et al. ............ 455/556.1 |
| 2005/0150122 A1* | 7/2005 | Cho et al. ........................ 33/356 |
| 2008/0059888 A1* | 3/2008 | Dunko .......................... 715/744 |
| 2010/0277337 A1* | 11/2010 | Brodersen et al. ....... 340/825.22 |

* cited by examiner

*Primary Examiner* — James A Thompson
*Assistant Examiner* — David H Chu
(74) *Attorney, Agent, or Firm* — Cha & Reiter, LLC

(57) ABSTRACT

An apparatus and a method for changing a screen mode depending on a posture and movement of a terminal are provided. A motion sensor measures a value of a three-axis sensor that changes depending on the posture or movement of the terminal, and transfers the measured value to the controller. A storage stores a plurality of screen modes corresponding to the posture or movement of the terminal. A controller determines the posture or movement of the terminal using the value of the three-axis sensor transferred from the motion sensor, and maintains the current screen mode a change in one of three axes is greater than the other two axes which indicates a user did not intended to switch the screen mode.

23 Claims, 3 Drawing Sheets

APPARATUS AND METHOD FOR CONTROLLING TERMINAL THROUGH MOTION RECOGNITION

CLAIM OF PRIORITY

This application claims the benefit of a Korean patent application filed in the Korean Intellectual Property Office on Feb. 20, 2009 and assigned Serial No. 10-2009-0014381, the entire disclosure of which is hereby incorporated by reference.

BACKGROUND OF THE INVENTION

1. Field of the Invention

The present invention relates to an apparatus and a method for controlling a terminal by recognizing a user's motion in the terminal. More particularly, the present invention relates to an apparatus and a method for controlling a screen mode such that the screen mode is not switched with respect to a motion unintended by a user.

2. Description of the Related Art

Recently, mobile terminals such as Personal Digital Assistants (PDAs) and other mobile computer devices are widely used and provide more than basic functions of voice/data communication and schedule management. The application of mobile terminals now extends to image capturing through a digital camera module mounted thereon, satellite broadcasting viewing, document editing, games, etc.

As the application of mobile terminals expand, the type and an amount of display data output to a display unit have significantly increased. The display data includes horizontal and vertical orientation output depending on the data and preference of some users. Accordingly, the mobile terminal may selectively rotate display data vertically or horizontally and output the same on the display unit.

However, the conventional horizontal/vertical switching of the display data uses a manual switching method. When needed, a user needs to manipulate the mobile terminal to switch the display orientation. In addition, in many cases, the horizontal/vertical view orientation switching occurs regardless of a user's intention. Therefore, a method for discriminating between user-intended horizontal/vertical switching and user-unintended horizontal/vertical switching is needed.

SUMMARY OF THE INVENTION

An aspect of the present invention is to address at least the above-mentioned problems and/or disadvantages and to provide at least the advantages described below. Accordingly, an aspect of the present invention is to provide an apparatus and a method for controlling a terminal by recognizing a user's motion relative to the terminal. Another aspect of the present invention is to provide an apparatus and a method for controlling to maintain a screen mode when a change value of one axis is greater than other two axes using a three-axis sensor.

In accordance with an aspect of the present invention, an apparatus of a terminal, for changing a screen mode depending on a posture or movement of the terminal is provided. The apparatus includes an input unit for transferring a user's input information to a controller, a motion sensor for measuring values of three-axis coordinates that change depending on the movement of the terminal, a display unit for displaying at least two of screen modes, and the controller for determining whether to change a screen mode based on an amount of change in the measured three-axis coordinates from previously detected three-axis coordinates.

In accordance with another aspect of the present invention, a method for changing a screen mode depending on a posture or movement of a terminal is provided. The method includes generating coordinate values of three axes indicative of the movement of the terminal using a motion sensor; determining an amount of change of each axis by comparing the generated coordinate values of the three axes from previous coordinate values of three axes; comparing an amount of change of one of the three axes with amounts of change of the other two axes; and changing a screen mode based on the compared result.

In accordance with another aspect of the present invention, a mobile terminal for selectively changing a screen orientation includes a motion sensor for measuring values of three-axis coordinates that change depending on the movement of the terminal; and a controller for determining an amount of change in the measured three-axis coordinates from previously detected three-axis coordinates and determining an amount of change in one of the three axes is greater than the other two axes, wherein the controller maintains the screen orientation if the amount of change in one of the three axes is greater than the other two axes.

In the embodiment, the screen mode comprises one of a horizontal orientation and a vertical orientation.

Other aspects, advantages and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above features and advantages of certain exemplary embodiments of the present invention will be more apparent to those skilled in the art from the following description taken in conjunction with the accompanying drawings in which.

Throughout the drawings, like reference numerals will be understood to refer to like parts, components and structures.

DETAILED DESCRIPTION OF THE INVENTION

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

It should be noted that the terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

Figure 1:
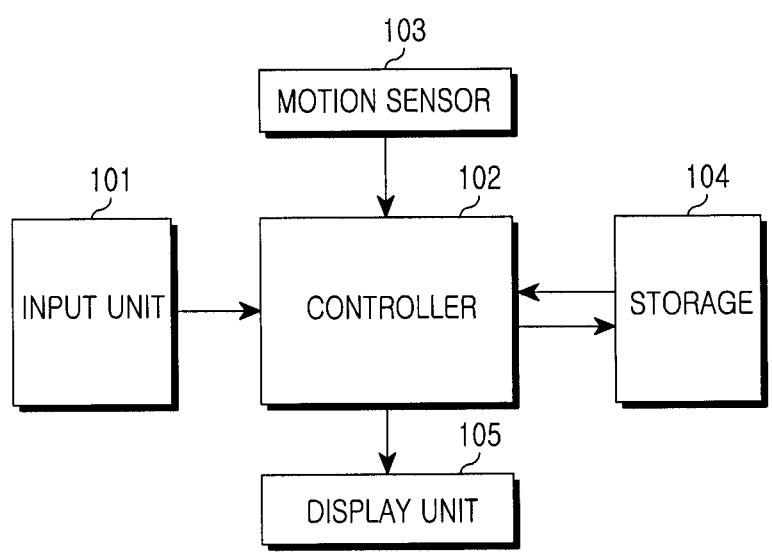
FIG. 1 is a block diagram illustrating a terminal according to an exemplary embodiment of the present invention.

FIG. 1 is a block diagram illustrating a terminal for changing a screen mode depending on a location or movement according to an exemplary embodiment of the present invention.

Referring to FIG. 1, an input unit 101 receives data or commands signals from with a user and transmits it to a controller 102 using a key button, a touchscreen, a touch pad, a microphone, etc.

A motion sensor 103 is a sensor in which functions of various sensors such as an earth magnetism sensor, an acceleration sensor, etc. for recognizing a movement or location of an object and functions of an altimeter, a gyro, etc. are incorporated into one chip. The motion sensor 103 detects a movement of the terminal, converts the detected movement into numerical values, and transfers the numerical values to the controller 102. For example, the motion sensor 103 detects a location or movement of the terminal using a three-axis sensor, converts the detected data into a set of numerical values, and then transfers the numerical value to the controller 102. Here, the three axes may be axes of a Rectangular coordinate system. Hence, the detected movement of a terminal can be translated into coordinates of three axes in which the coordinates of a point are its distances from a set of perpendicular lines that intersect at an origin, such as two lines in a plane or three in space.

A storage 104 stores a plurality of screen modes, i.e., a horizontal orientation, vertical orientation, or other orientation corresponding to a location or movement of the terminal so that the controller 102 can make the desired screen mode for viewing.

A display unit 105 selectively displays different screen modes stored in the storage 104 according to a command of the controller 102.

The controller 102 receives a value or values indicative of a movement or location of the terminal from the motion sensor 103, and compares the received value with a previously received value to determine an amount of change. At this point, the controller 102 compares an amount of change of one of the three axes with an amount of change of the other axes, and maintains a screen mode displayed on the display unit 105 if the amount of change of the one axis is greater than the other axes. Here, the one axis is perpendicular to a screen of the terminal.

When the amount of change of one axis is smaller than the amount of change of the other axes, the controller 102 compares an amount of change of at least one axis of the other two axes with a reference amount of change for switching a screen mode. At this point, when the amount of change of the at least one axis of the other two axes is greater than the reference amount of change for switching the screen mode, the controller 102 extracts a screen mode corresponding to the amount of change of the other two axes from the storage 104, and displays the extracted screen mode on the display unit 105.

Figure 2:
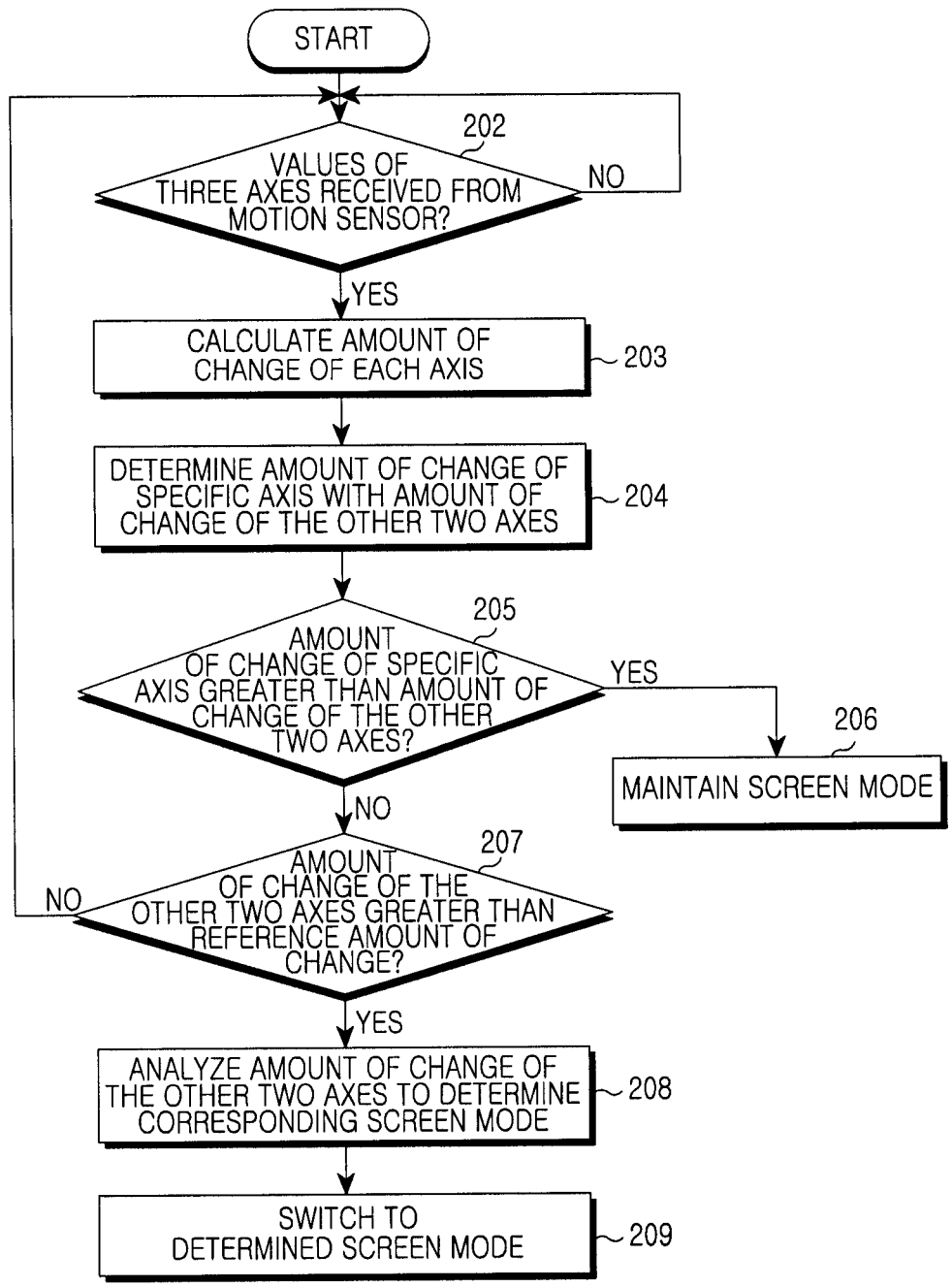
FIG. 2 is a flowchart illustrating a method for changing a screen mode depending on a location or movement according to an exemplary embodiment of the present invention.
Figure 3A:
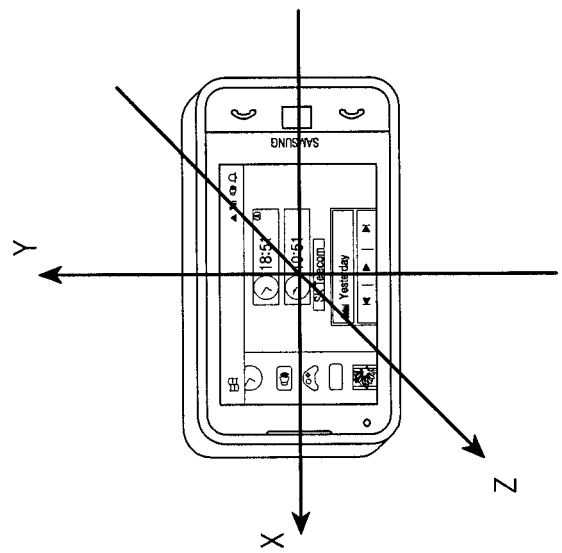
FIGS. 3A and 3B are a schematic view illustrating a terminal for switching a screen mode according to an exemplary embodiment of the present invention.
Figure 3B:
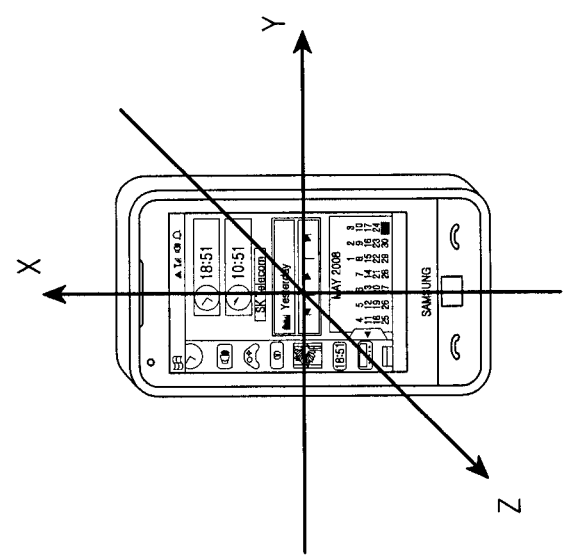

FIG. 2 is a flowchart illustrating a method for changing a screen mode depending on a location or movement according to an exemplary embodiment of the present invention, and FIG. 3 is a schematic view illustrating a terminal for switching a screen mode according to an exemplary embodiment of the present invention.

Referring to FIG. 2, the controller 102 receives values representative of the three axes from the motion sensor in step 202.

The controller 102 determines amounts of changes of respective three axes using the received values indicative of the respective three axes from the previously received values of the three axes in step 203.

The controller 102 compares an amount of change of an axis normal to the screen of the terminal with amounts of change of the other two axes in step 204, and proceeds to step 205. Then, the controller 102 compares the amount of change of the other two axes with an amount of change of the normal axis in step 205. At this point, when the amount of change of the normal axis is greater than the amount of change of the other two axes, the controller 102 determines that the user did not intended to change the screen mode and maintains the screen mode currently displayed on the display unit in step 206.

In contrast, when the amount of change of the normal axis is smaller than the amount of change of at least one of the other two axes in step 205, the controller 102 compares the amount of change of the other two axes with a reference amount of change in step 207. For example, when the terminal moves from FIG. 3A to FIG. 3B and an amount of change of an axis normal to the screen of the terminal is smaller than an amount of change of at least one of the other two axes, the controller 102 proceeds to step 207.

When the amount of change of the other two axes is smaller than the reference amount of change, the controller returns to step 205.

When the amount of change of at least one of the other two axes is greater than the reference amount of change in step 207, the controller 102 analyzes an amount of change of the other two axes is indicative of request to change the screen mode and determines a new screen mode accordingly in step 208.

The controller receives the corresponding screen mode from the storage and displays the new screen mode on the display unit in step 209.

As described above, according to a method for controlling a terminal by recognizing a user's motion in the terminal or a location of the terminal, whether the user intentionally requests screen mode switching is determined by utilizing a value of a motion sensor. When an intentional request is verified, screen mode switching is performed. When it is determined that an intentional request is not determined, the existing screen mode is maintained, so that screen mode switching undesired by the user may not be performed.

The above-described methods according to the present invention can be realized in hardware or as software or computer code that can be stored in a recording medium such as a CD ROM, an RAM, a floppy disk, a hard disk, or a magneto-optical disk or downloaded over a network, so that the methods described herein can be executed by such software using a general purpose computer, or a special processor or in programmable or dedicated hardware, such as an ASIC or FPGA. As would be understood in the art, the computer, the processor or the programmable hardware include memory components, e.g., RAM, ROM, Flash, etc. that may store or receive software or computer code that when accessed and executed by the computer, processor or hardware implement the processing methods described herein. As would be recognized by those skilled in the art, when a general purpose computer is loaded with, or accesses, software or code for implementing the processing shown herein, the general purpose computer is transformed into a special purpose computer that may at least perform the processing shown herein.

Although the invention has been shown and described with reference to certain exemplary embodiments thereof, it will be understood by those skilled in the art that various changes in form and details may be made therein without departing from the spirit and scope of the invention as defined by the appended claims and their equivalents. Therefore, the scope of the present invention should not be limited to the above-described embodiments but should be determined by not only the appended claims but also the equivalents thereof.

What is claimed is:

1. An apparatus for changing a screen orientation depending on a detected movement of a terminal, comprising:
    a motion sensor for measuring values of three-axis coordinates that change depending on the movement of the terminal;
    a display unit for displaying at least two of screen modes; and
    a controller for determining whether to change a screen mode based on an amount of change in the measured three-axis coordinates from previously detected three-axis coordinates,
    wherein, if the amount of change in the one of the three axis coordinates is smaller than of the other two axis coordinates, the controller switches another screen mode that corresponds to the movement of the terminal.

2. The apparatus of claim 1, wherein the controller maintains the screen mode if an amount of change in one of three-axis coordinates is greater than the other two-axis coordinates.

3. The apparatus of claim 1, wherein the three axes coordinates comprise three axes of a Rectangular coordinate system.

4. The apparatus of claim 3, wherein the one of three axes is perpendicular to a screen of the terminal.

5. The apparatus of claim 1, wherein the controller switches to another screen mode if the amount of change in at least one of the other two axis coordinates is greater than a predetermined amount of change.

6. The apparatus of claim 1, wherein the terminal is a mobile phone.

7. The apparatus of claim 1, wherein the screen mode comprises one of a horizontal orientation and a vertical orientation.

8. A method for changing a screen orientation depending on a movement of a terminal, the method comprising:
    generating coordinate values of three axes indicative of the movement of the terminal using a motion sensor;
    determining an amount of change of each axis by comparing the generated coordinate values of the three axes from previous coordinate values of three axes;
    comparing an amount of change of one of the three axes with amounts of change of the other two axes; and
    changing a screen mode based on the compared result, wherein changing a screen mode comprising:
    maintaining the screen mode if the amount of change of one of the three axes is greater than the other two axes.

9. The method of claim 8, wherein changing a screen mode comprising;
    maintaining the screen mode if the amount of change of one of the three axes is great than the other two axes.

10. The method of claim 8, wherein the three axes of the motion sensor comprise three axes of a Rectangular coordinate system.

11. The method of claim 8, wherein the one axis is perpendicular to a screen of the terminal.

12. The method of claim 8, wherein changing a screen mode comprising:
    when the amount of change of the one axis is smaller than the other two axes, determining whether an amount of change in at least one of the other two axes is greater than a predetermined value;
    when the amount of change of the at least one axis of the other two axes is greater than the predetermined value, determining a new screen mode that corresponds to the movement of the terminal; and
    switching the screen mode to the new screen mode.

13. The apparatus of claim 6, wherein the screen mode comprises one of a horizontal orientation and a vertical orientation.

14. A mobile terminal for changing a screen orientation, comprising:
    a motion sensor for measuring values of three-axis coordinates that change depending on the movement of the terminal;
    a controller for determining an amount of change in the measured three-axis coordinates from previously detected three-axis coordinates and determining an amount of change in one of the three axis coordinates is greater than the other two axis coordinates; and
    wherein the controller maintains the screen orientation if the amount of change in one of the three axis coordinates is greater than the other two axis coordinates.

15. The mobile terminal of claim 14, wherein the controller, if the amount of change in the one of the three-axes coordinates is smaller than the other two axis coordinates, determines if the amount of change in at least one of the other two axis coordinates is greater than a predetermined amount of change.

16. The mobile terminal of claim 15, wherein the controller changes the screen orientation to another orientation that corresponds to the movement of the terminal.

17. The mobile terminal of claim 14, wherein the three-axis coordinates comprise three axes of a Rectangular coordinate system.

18. The mobile terminal of claim 14, wherein the one of three-axes is perpendicular to a screen of the terminal.

19. The mobile terminal of claim 14, wherein the screen orientation comprises one of a horizontal orientation and a vertical orientation.

20. An apparatus for changing a screen orientation depending on a detected movement of a terminal, comprising:
    a motion sensor for measuring values of three-axis coordinates that change depending on the movement of the terminal;
    a display unit for displaying at least two of screen modes; and
    a controller for determining whether to change a screen mode based on an amount of change in the measured three-axis coordinates from previously detected three-axis coordinates,
    wherein the controller maintains the screen mode if an amount of change in one of three-axis coordinates is greater than the other two-axis coordinates.

21. The apparatus of claim 20, wherein the controller switches to another screen mode if the amount of change in at least one of the other two axis coordinates is greater than a predetermined amount of change.

22. The method of claim 8, wherein if the amount of change in the one of the three axis coordinates is smaller than at least one of the other two axis coordinates, changing the screen mode.

23. The method of claim 22, wherein changing a screen mode comprising:

when the amount of change of the one axis is smaller than the other two axis coordinates, determining whether an amount of change in at least one of the other two axis coordinates is greater than a predetermined value;

when the amount of change of the at least one axis of the other two axis coordinates is greater than the predetermined value, determining a new screen mode that corresponds to the movement of the terminal; and switching the screen mode to the new screen mode.

* * * * *

UNITED STATES PATENT AND TRADEMARK OFFICE
CERTIFICATE OF CORRECTION

PATENT NO. : 8,493,413 B2
APPLICATION NO. : 12/708568
DATED : July 23, 2013
INVENTOR(S) : Hyun-Young Mo It is certified that error appears in the above-identified patent and that said Letters Patent is hereby corrected as shown below:

In the Claims:

Column 5, Claim 9, Line 58 should read as follows:
--...is greater than the...--

Signed and Sealed this
Seventeenth Day of September, 2013

Teresa Stanek Rea
*Deputy Director of the United States Patent and Trademark Office*